United States Patent
Sakamoto et al.

(10) Patent No.: US 7,110,070 B2
(45) Date of Patent: Sep. 19, 2006

(54) ACTIVE-MATRIX ADDRESSED REFLECTIVE LCD AND METHOD OF FABRICATING THE SAME

(75) Inventors: Michiaki Sakamoto, Tokyo (JP); Yuichi Yamaguchi, Tokyo (JP); Hidenori Ikeno, Tokyo (JP); Fumihiko Matsuno, Tokyo (JP); Hironori Kikkawa, Tokyo (JP)

(73) Assignees: NEC Corporation, Tokyo (JP); NEC LCD Technologies, Ltd., Kawasaki (JP)

( * ) Notice: Subject to any disclaimer, the term of this patent is extended or adjusted under 35 U.S.C. 154(b) by 0 days.

(21) Appl. No.: 11/017,055

(22) Filed: Dec. 21, 2004

(65) Prior Publication Data

US 2005/0110927 A1    May 26, 2005

Related U.S. Application Data

(62) Division of application No. 10/074,256, filed on Feb. 14, 2002, now Pat. No. 6,862,057.

(30) Foreign Application Priority Data

Feb. 14, 2001    (JP)    ............................. 2001-036799

(51) Int. Cl.
G02F 1/1333    (2006.01)

(52) U.S. Cl. .......................... 349/113; 349/138; 349/38

(58) Field of Classification Search ................ 349/113, 349/38, 43
See application file for complete search history.

(56) References Cited

U.S. PATENT DOCUMENTS

| 5,500,750 | A * | 3/1996 | Kanbe et al. ................. 349/42 |
| 6,262,783 | B1 | 7/2001 | Tsuda et al. |
| 6,266,111 | B1 | 7/2001 | Kataoka et al. |
| 6,373,540 | B1 | 4/2002 | Munakata |
| 6,747,718 | B1 | 6/2004 | Kanou et al. |
| 6,784,957 | B1 * | 8/2004 | Kanou et al. ............... 349/113 |

FOREIGN PATENT DOCUMENTS

JP    61-6390    2/1986

* cited by examiner

Primary Examiner—Toan Ton
(74) Attorney, Agent, or Firm—McGinn IP Law Group, PLLC

(57) ABSTRACT

In order to improve processing steps of fabricating an active-matrix addressed reflective liquid crystal display, a lower substrate, which is positioned at one side with respect to a liquid crystal layer, is provided with two electrodes in parallel with each other and in parallel with the liquid crystal layer. One of the two electrodes is electrically coupled to a source electrode of a switching element assigned to one pixel, and the other electrode is electrically couple to a constant potential source. Each of the two electrodes has characteristics of light reflectivity, which is able to reduce the intensity of exposing light when an insulating layer provided above the electrodes is patterned.

14 Claims, 16 Drawing Sheets

PANEL DISPLAY AREA

ACTIVE-MATRIX ADDRESSED REFLECTIVE LCD AND METHOD OF FABRICATING THE SAME

The present Application is a Divisional Application of U.S. patent application Ser. No. 10/074,256, filed on Feb. 14, 2002 now U.S. Pat. No. 6,862,057.

BACKGROUND OF THE INVENTION

1. Field of the Invention

The present invention relates generally to an active-matrix addressed liquid crystal display (LCD), and more specifically to such an LCD having a reflective electrode via which ambient light as the reading source is reflected thereby and again emitted out of the device. Still more specifically, the present relates to a method of fabrication such an LCD.

2. Description of Related Art

LCDs have found extensive uses in a variety of electronic devices such as television receivers, personal computers, personal digital assistances (PDAs), mobile telephone terminals, picture monitors, and so on. Among others, active-matrix addressed LCDs have widely utilized, which are provided with a plurality of active elements (switching elements) respectively assigned to pixel electrodes for controlling application of voltages thereto. The active element is typically a thin film transistor (TFT) or a metal-insulator-metal (MIM) diode. The active-matrix addressed LCD has distinct features of high resolution, a wide viewing angle, a high contrast, multi-gradation, etc.

The active-matrix addressed LCDs are generally classified into two types: one is transmissive (backlit) and the other is reflective. Although the transmissive LCD has many advantages, it has encountered the problems resulting from the presence of a built-in light source. Namely, the transmissive LCD undesirably becomes bulky and consumes considerable power. Therefore, in the case where low power consumption is needed such as in mobile telephone terminals, it becomes a current tendency to use a reflective LCD. The reflective LCD is provided with a reflective electrode for reflecting ambient light. In order to enhance reflectivity, it is a common practice to provide fine roughness on the reflective electrode.

Before turning to the present invention, it is deemed preferable to briefly describe, with reference to FIGS. 1 to 2J, the conventional technology relevant to the present invention.

FIG. 1 is a schematic cross section showing approximately one pixel area of an active-matrix addressed reflective LCD using a single polarizing plate. The LCD shown in FIG. 1 generally comprises an upper substrate (or opposite substrate) 1, a lower substrate (TFT substrate) 7, and a liquid crystal layer 14 provided between the two substrates 1 and 7. As shown, the upper substrate 1 is comprised of a polarizing plate 2, a phase shifting plate 3, a glass substrate 4, a color filter 5, and a transparent electrode (common electrode) 6. On the other hand, the lower substrate 7 is comprised of a glass substrate 8, a thin film transistor 9 formed on the glass substrate 8, a first insulation layer 10 with unevenness or irregularity on the surface thereof, a second insulation layer 11 which is formed on the first insulation layer 10 and is made of polyimide, and a reflective electrode (reflective layer) 13. The thin film transistor 9 operates as a switching element. The reflective electrode 13, which is typically made of aluminum, is coupled to a source electrode 12 and functions as a pixel electrode in addition to reflecting ambient light. A liquid crystal layer 14 is sandwiched between the two substrates 1 and 7.

As shown in FIG. 1, incoming ambient light, schematically denoted by reference number 15, passes through the upper substrate 1, being reflected by the coarse-surfaced reflection layer 13, and returning to external environments as schematically shown by reference numeral 16.

In order to improve reflectivity at the reflective electrode 13, it is vital to make the upper surface of the electrode 13 uneven or irregular so as to effectively reflect incident light with various incident angles. The conventional irregularity appearing on the surface of the reflective electrode 13 is formed on the basis of a plurality of small hemispheres independently, randomly provided on the glass substrate 8.

Referring to FIGS. 2A–2J, a method of fabricating the above-mentioned conventional reflective electrode 13 will be described.

A gate electrode 21 is formed on the glass substrate 20 (FIG. 2A). Thereafter, a gate insulation film 22, a semiconductor layer 23, and a doping layer 24 are successively formed on the glass substrate 20 (FIG. 2B), after which an island 25 is formed by patterning the doping layer 24 and the semiconductor layer 23 (FIG. 2C). Subsequently, after a metal layer is deposited on the surface of the layer formed in FIG. 2C, a source electrode 26 and a drain electrode 27 are formed by patterning (FIG. 2D). Thus, the thin film transistor 9 is obtained.

Following this, as shown in FIG. 2E, a photo-sensitive organic insulation layer 28, which is of acrylic type photoresist (for example), is deposited on the surface of the resultant substrate obtained at the preceding step of FIG. 2D. Subsequently, a plurality of projections 29 are patterned by photolithography in the area above which the reflective electrode is to be formed (FIG. 2F), after which the projections 29 are heat-treated so that the angular parts thereof are smoothed, as shown in FIG. 2G. Thereafter, the smoothed projections 29 are covered by an organic insulation film 31, and accordingly, the surface of this film 31 exhibits smoothed irregular surface (FIG. 2H). Then, a contact hole 33 is formed (FIG. 2I), after which the reflection electrode 34 is deposited, as shown in FIG. 2J, on the surface of the resultant substrate obtained the preceding step of FIG. 2I. Thus, the source electrode is electrically connected to the reflective electrode 34. The above-mentioned technique is disclosed in Japanese Post-Examination Patent Application No. 61-6390.

However, the active-matrix addressed reflective LCD according to the above-mentioned conventional technique has suffered from the following difficulties.

First, the photo-sensitive insulation layer 28 is patterned by photolithography, in the case of which a low-sensitive photoresist such acrylic type is typically selected in order to obtain fine adjustment of irregularity. Therefore, the conventional technique suffers from the problems that the intensity of exposing light should be increased and the exposure time becomes long, which renders the fabrication processes complicated and undesirably increase the fabrication time of the device.

Second, the storage capacitance of each pixel is small, and thus, it is liable to induce flicker. In order to increase the storage capacitance, it is conceivable to increase overlapped area of the gate line and the reflective electrode (viz., pixel electrode) as implemented in a transmissive LCD. However, since each of the organic insulation layer 28 and the polyimide layer 11 has inherently a considerably large thickness in the case of an active-matrix addressed reflective LCD, and as such, it is difficult to realize sufficient storage capacitance.

Third, the projections 29 shown in FIG. 2G have typically diameters approximately ranging from 1 to 20 μm and heights approximately from 0.5 to 5 μm, and are independently formed on the gate insulation layer 22. Accordingly, the projections 29 are liable to peel off from the gate insulation layer 22 during the substrate processing of washing, heat treatment, film deposition, etc. As a result, it is difficult to achieve the expected irregularity on the surface of the reflection electrode 34.

SUMMARY OF THE INVENTION

It is therefore an object of the present invention to provide an active-matrix type addressed LCD device, which is able to overcome the above-mentioned difficulties inherent in the prior art.

Another object of the present invention is to provide a method of fabricating an active-matrix addressed reflective LCD device, via which the above-mentioned difficulties inherent in the prior art can be overcome.

In brief, these objects are achieved by the techniques wherein In order to improve processing steps of fabricating an active-matrix addressed reflective liquid crystal display, a lower substrate, which is positioned at one side with respect to a liquid crystal layer, is provided with two electrodes in parallel with each other and in parallel with the liquid crystal layer. One of the two electrodes is electrically coupled to a source electrode of a switching element assigned to one pixel, and the other electrode is electrically couple to a constant potential source. Each of the two electrodes has characteristics of light reflectivity, which is able to reduce the intensity of exposing light when an insulating layer provided above the electrodes is pattered.

One aspect of the present invention resides in an active-matrix addressed reflective LCD (liquid crystal display), which comprises: a first substrate which is transparent, a second substrate, a lower insulation film formed on said second substrate, a plurality of switching elements respectively provided for each pixel, an insulation layer having a surface irregularly configured, and a reflection film (70) formed on said insulation film and having an irregularly configured surface depending on the irregular surface of said insulation film; and a liquid crystal layer provided between said first substrate and said reflection film, characterized by an upper electrode being provided for each pixel and located in a region wherein said reflection film is provided, said upper electrode being electrically coupled to a source electrode of the switching element; and a lower electrode provided between said second substrate and said lower insulation film, said lower electrode forming a storage capacitance with said upper electrode.

Another aspect of the present invention resides in a method of fabricating an active-matrix addressed reflective LCD, comprising the steps of: (a) forming a reflection layer on a substrate; (b) forming an insulation layer on said reflection layer, after which said insulation layer is patterned by exposure so as to provide irregularity on the surface of said insulation layer; and (c) forming a reflection film on said insulation film, wherein said insulation layer is patterned with assist of light reflected by said reflection layer.

BRIEF DESCRIPTION OF THE DRAWINGS

The features and advantages of the present invention will become more clearly appreciated from the following description taken in conjunction with the accompanying drawings in which like elements or portions are denoted by like reference numerals and in which.

DETAILED DESCRIPTION OF THE PREFERRED EMBODIMENTS

A preferred embodiment of the present invention will be described with reference to FIGS. 4 to 7I.

Figure 3:
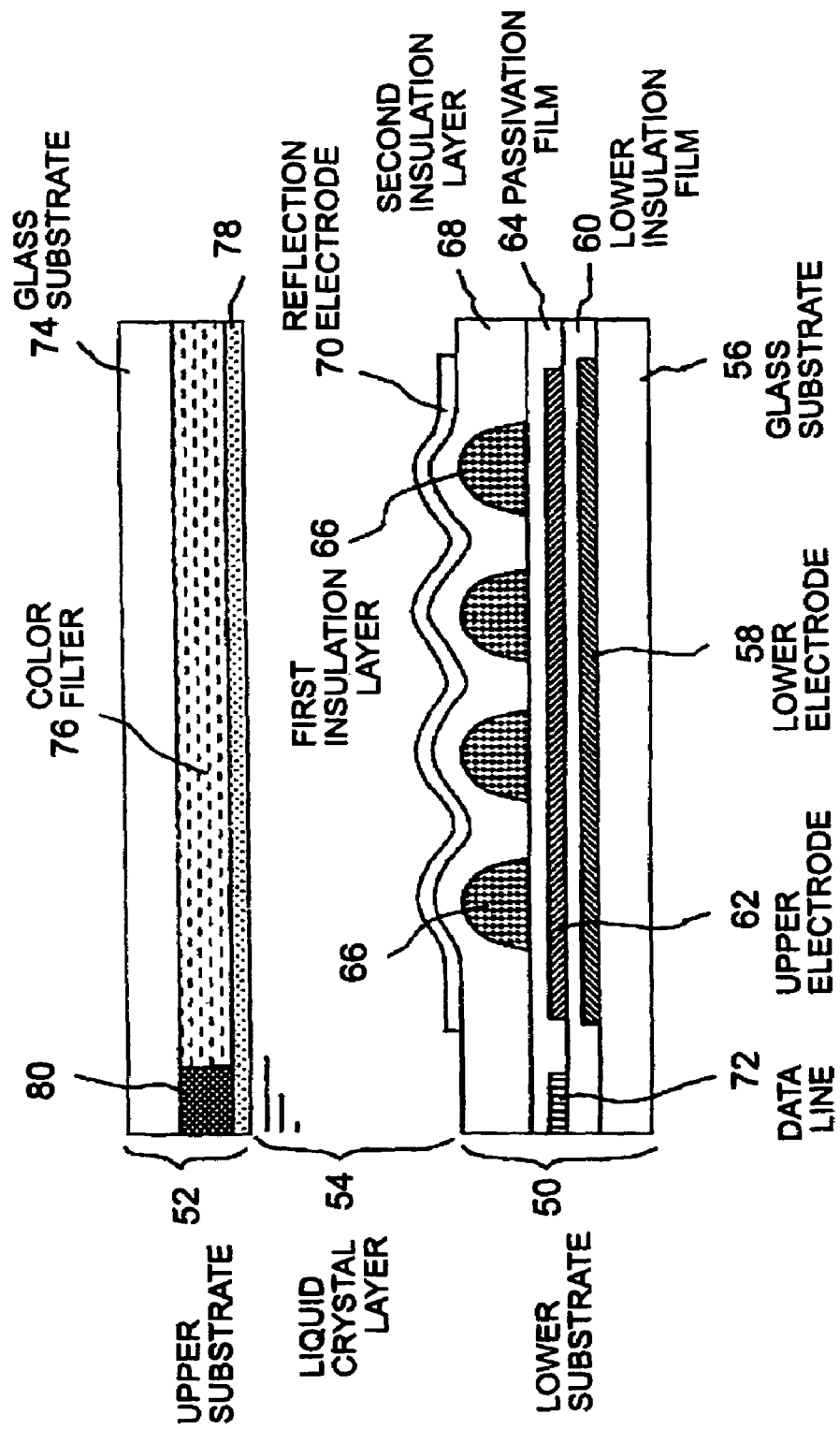
FIG. 3 is a schematic cross section of approximately one pixel area according to an embodiment of the present invention.
Figure 4A:
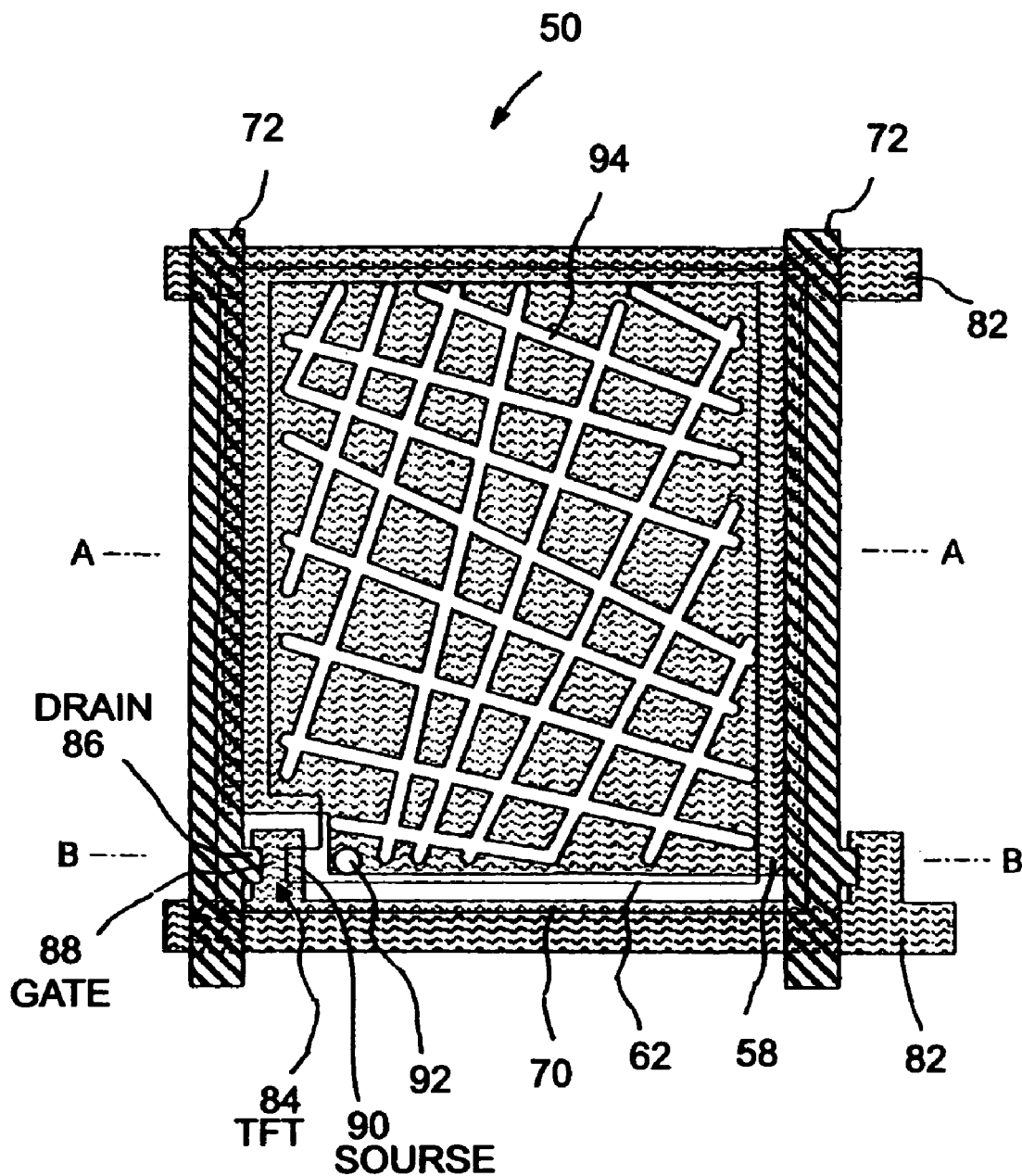
FIGS. 4A and 4B are each a plan view of approximately one pixel area of FIG. 3.

FIG. 3 is a sectional view of approximately one pixel area taken along a center line of the pixel, viz., along section line A—A of FIG. 4A, and thus, a switching element such as a thin film transistor is not shown in FIG. 3. The pixel area of FIG. 3 forms part of an active-matrix addressed reflective LCD according to the embodiment of the present invention.

The pixel area shown in FIG. 3 generally comprises a lower substrate 50, an upper substrate 52, and a liquid crystal layer 54 hermetically sealed between the substrates 50 and 52.

The lower substrate 50 is comprised of a glass substrate 56 on which a lower electrode 58 is provided. The lower electrode 58 is covered by a lower insulation film 60 that is also used as a gate insulation film of the thin film transistor (not shown in FIG. 3). An upper electrode 62 is deposited on the lower insulation film 60, and is covered by a passivation film 64.

Figure 4B:
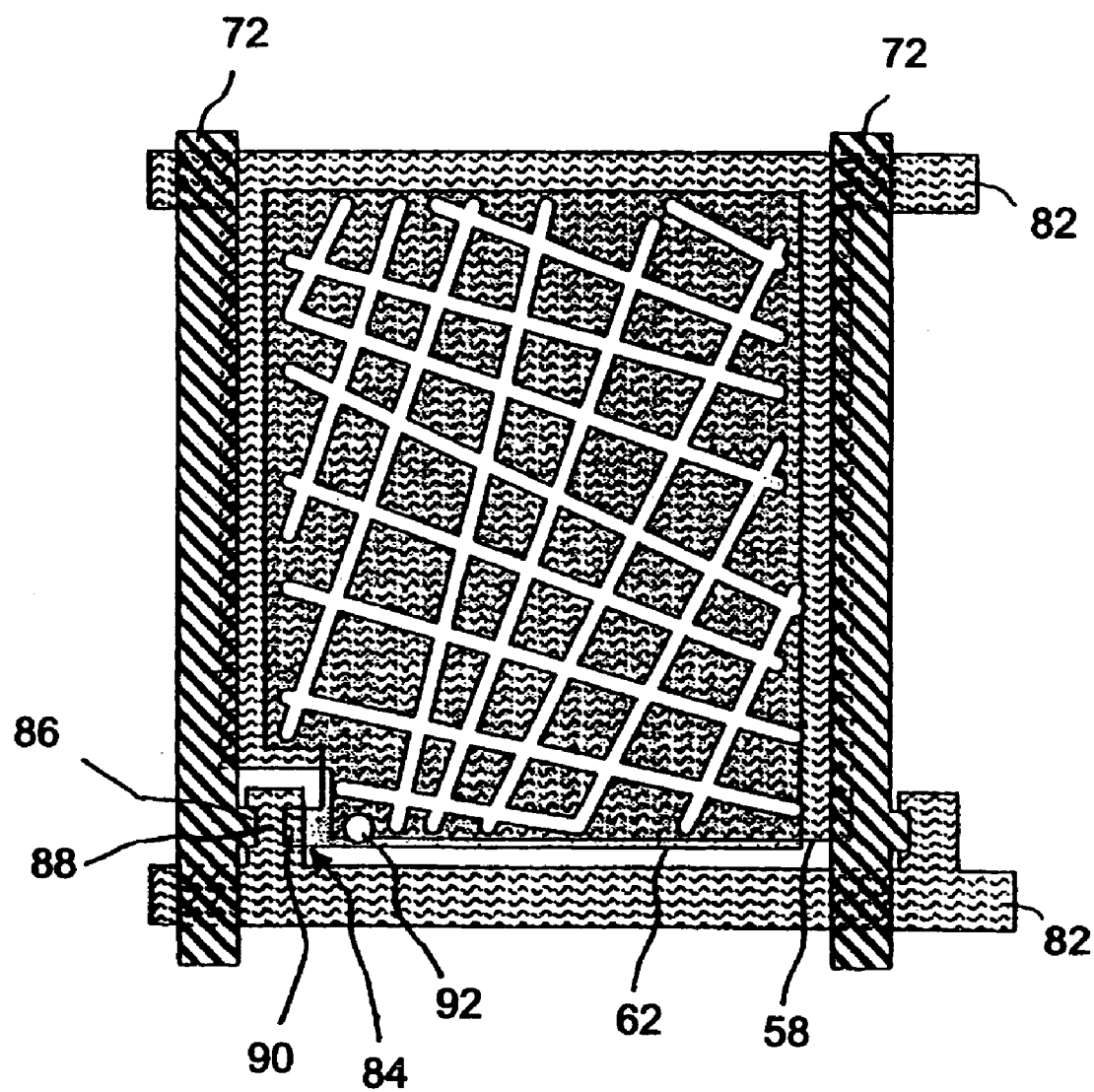

The lower substrate 50 further comprises a first insulation layer 66, which appears as island-like shapes in FIG. 3, has in fact a randomly shaped mesh-like configuration as best shown in FIGS. 4A and 4B. A second insulation layer 68 is deposited on the first insulation layer 66, having an upper surface exhibiting irregularity, and carrying thereon a reflection electrode (reflection film or layer) 70. It is noted that each pixel area is provided with the independent reflection electrode 70 (viz., not-coupled to the reflection electrodes of the adjacent pixel areas). The reflection electrode 70 is typically made of high reflection metal such as aluminum, and also functions as a pixel electrode. A reference numeral 72 denotes a data (drain) line which will be referred to later. In the above, although not shown in FIG. 3, the reflection electrode 70 is coupled to the source electrode of a thin film transistor. The lower insulation film 60 is made of aluminum oxide, silicon oxide, or silicon nitride. Further, the passivation film 64 is made of silicon nitride or silicon oxide.

The first insulation layer 66 is made of photo-sensitive resin (viz., photoresist), and is patterned by known photolithography. The photoresist used to form the layer 66 may be either positive or negative, and, as an alterative, the layer 66 may be formed using acrylic type photoresist. Although the second insulation layer 68 can be made of polyimide, it is preferable to use photoresist in view of the fact that the portion of the second insulation layer 68, which corresponds to a contact hole, should be removed. Although not shown in FIG. 3, an alignment film is formed on the reflection layer 70.

The upper substrate 52 comprises a glass substrate 74, a color filter 76, and a transparent electrode 78, which are arranged as shown in FIG. 3. Although not shown in FIG. 3, an alignment film is formed on the inner surface of the transparent electrode 78, and a polarizing plate and a phase shifting plate are also provided as in the prior art. The part of the color filter 76 is replaced with a light block layer 80 (black matrix).

The lower and upper electrodes 58 and 62 are respectively provided with each pixel. The lower electrode 58 is formed together with a gate electrode and gate lines using a metal such as chrome or molybdenum during the same process. Thus, the lower electrode 58 has characteristics of light reflectivity. The lower electrode 58 can be formed so as to extend from the gate line assigned to the adjacent pixel on the same column, as is best shown in FIGS. 4A and 4B.

On the other hand, the upper electrode 62 can be formed integrally with the source electrode of the thin film transistor using metal such as chrome or molybdenum. The lower and upper electrodes 58 and 62 are respectively substantially flat layers, and are arranged in parallel such that the upper electrode 62 is positioned above the lower electrode 58 via the insulation layer 60. Accordingly, the lower and upper electrodes 58 and 62 functions as a storage capacitor provided in parallel with the liquid cell comparing to as a capacitor. Further, as will be described later, the upper electrode 62 operates as a light reflection layer during the process of the first insulation layer (photoresist) 66 being patterned. That is, exposing light, which has passed through the first insulation layer 66, is reflected by the upper electrode 62 and again irradiates the layer 66, thereby to be able to reduce amount of the exposing light to a considerable extent. In view of this, it is preferable to use a high reflection metal as the upper electrode 62 and to flatten the upper surface thereof.

Referring to FIGS. 4A and 4B, wherein FIG. 4A is a schematic plan view of the lower substrate 50 of one pixel area surrounded by adjacent data (drain) lines 72 and adjacent gate (scan) lines 82, and wherein FIG. 4B is identical to FIG. 4A except that the latter drawing omits the reflection electrode (or reflection layer) 70.

As shown in FIGS. 4A and 4B, the gate lines 82 are arranged in parallel and cross at right angles the data lines 72 also provided in parallel. A thin film transistor (TFT) 84 is located at the portion nearby the cross point of the data and gate lines 72 and 82. The drain electrode 86 of TFT 84 is coupled to the data line 72, and the gate electrode 88 is coupled to the gate line 82. The source electrode 90 is integrated with the upper electrode 62. As shown, the lower electrode 58 extends from the upper (preceding) gate line 82 into the pixel area. It is to be noted that the upper gate line 82 is provided for the upper pixel (not shown). The reflection electrode 70 (FIG. 4A) is coupled to the source electrode 90 via a contact hole 92.

In the case of a reflective LCD, the gate lines 82 and the data lines 72 are positioned outside of the pixel display area, and accordingly, it is typically to provide the light block layer 80 (black matrix) in the portions of the upper substrate 52 (see FIG. 3), which portions are positioned above the lines 82 and 72. The reflection electrode 70 is not formed on the portion above which the light block layer 80 is provided. This means that the reflection electrode 70 of any pixel is independently provided with respect to those of the adjacent pixels.

As shown in FIG. 4A, the upper surface of the reflection layer 70 carries thereon projections 94 linearly extending so as to provide irregularity (viz., convex-concave structure) thereto. The projections 94 imitate a mesh-like configuration of the first insulation layer 66 formed on the passivation film 64 (FIG. 3). That is to say, the projections 94 reflect the presence of the layer 66. The projections 94 are not provided on the areas above the drain lines 72 or the gate lines 82. Further, the projections 94 exhibit an irregularly patterned mesh-like structure.

As mentioned above, the lower electrode 58 and the upper electrode 62 are substantially flattened and provided in parallel under the reflection layer 70. Therefore, the passivation film 64 can be formed flat (viz., without any step), and accordingly, the first insulation layer 66 can be patterned keeping substantially equal the heights of the projections 94, thereby simplifying the control of the intensity of exposing light and the preparation of a mask pattern.

Figure 5A:
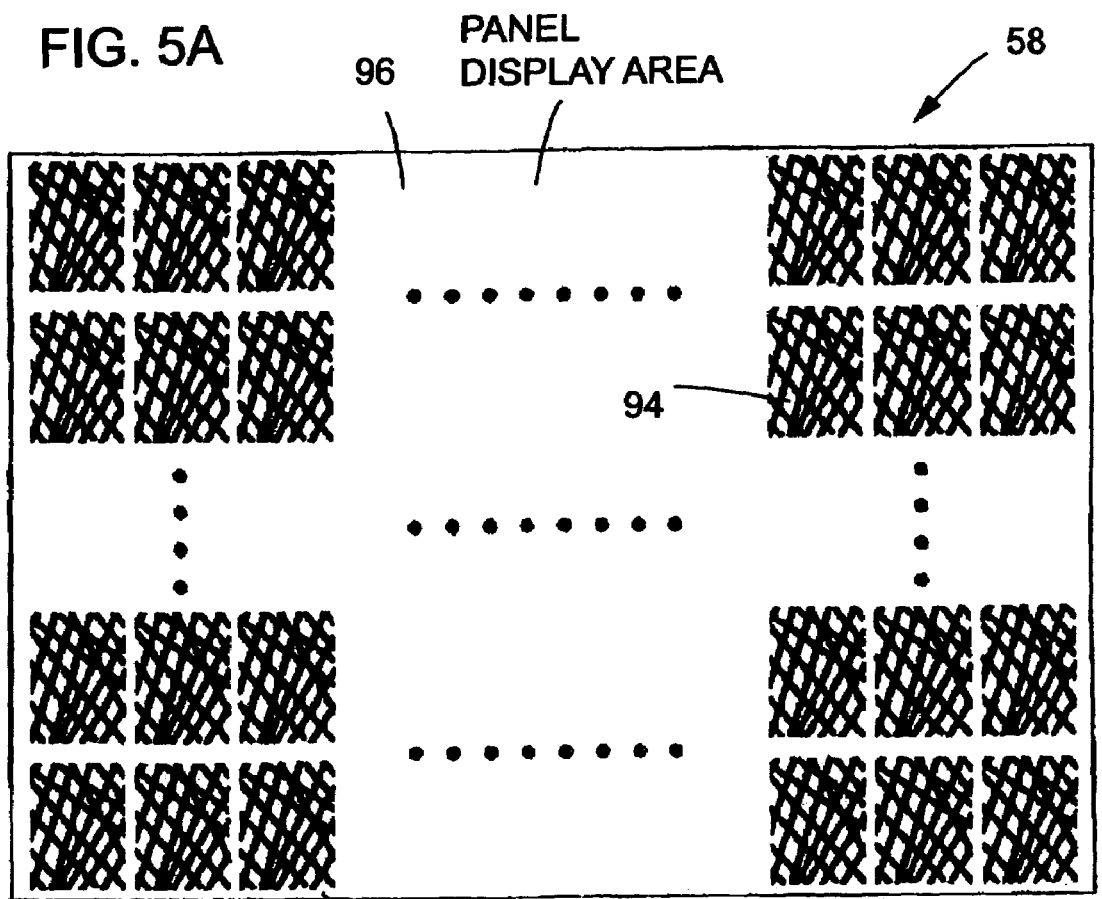
FIG. 5A is a diagram schematically showing a plurality of uneven patterns formed in a panel display area according to the embodiment of the present invention.
Figure 5B:
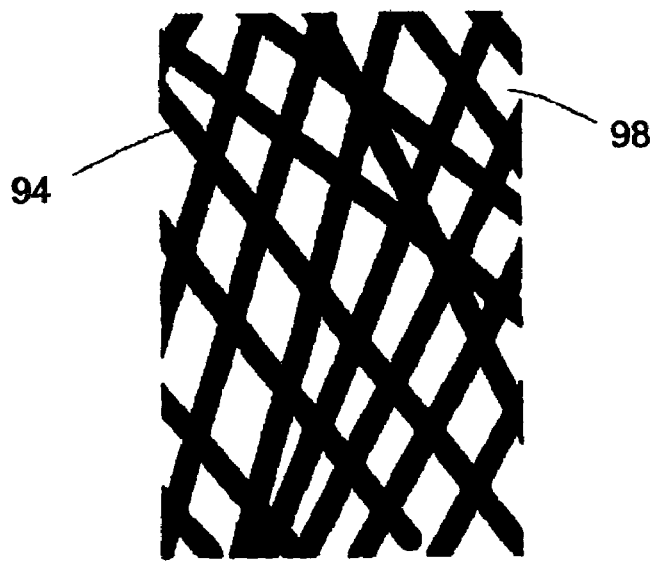
FIG. 5B is a diagram schematically showing one pattern of FIG. 5A on large scale.

FIG. 5A is a diagram schematically showing a plurality of patterns of the projections 94 formed on the lower substrate 50 within a panel display area 96, and FIG. 5B shows one pattern of the projections 94 on large scale. In FIGS. 5A and 5B, the projections 94 are represented by black bold lines unlike in FIGS. 4A and 4B wherein they are denoted by white bold lines. As shown in FIGS. 5A and 5B, the projections 94 extend linearly and asymmetrically, which implies that the concaved portions 98, each of which is surrounded by the projections 94, are irregularly provided within each pixel area.

It is understood from the foregoing that the first insulation layer 66 (FIG. 3), which corresponds to the projections 94, are continuously patterned on the passivation film 64. It is therefore possible to attain excellent adhesiveness of the patterned insulation layer 66 against the passivation film 64, resulting in the fact that the peel-off of the layer 66 from the passivation film 64 can be eliminated or reduced to a considerable extent.

Figure 6:
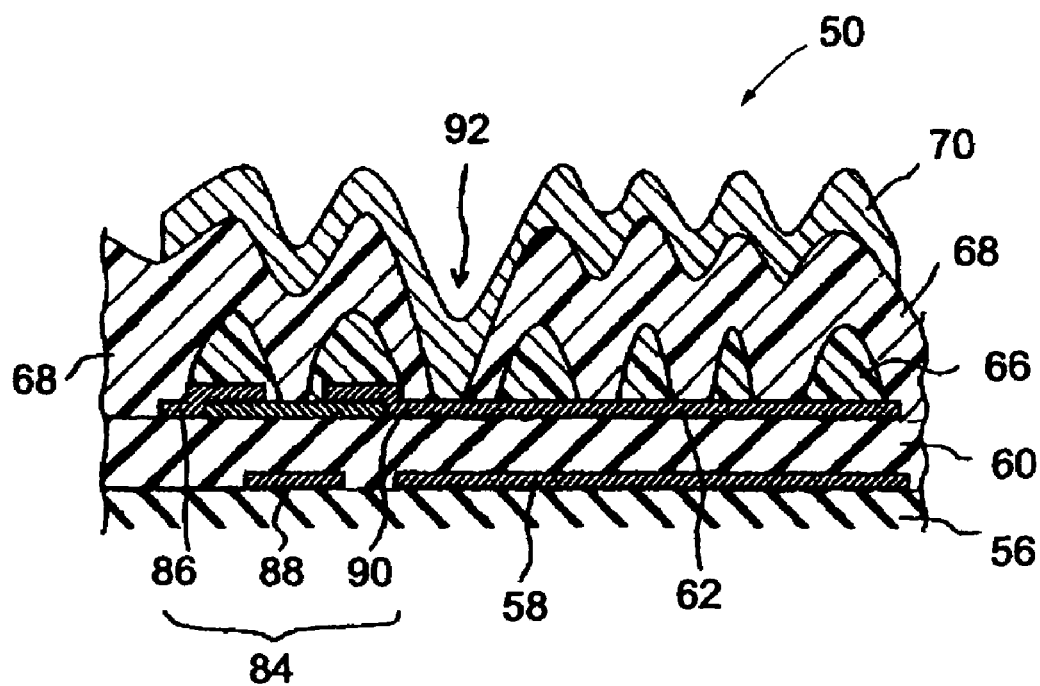
FIG. 6 is a schematic cross section of approximately one pixel area taken along a section line passing through a thin film transistor, which embodies the present invention.

Reference is made to FIG. 6, the lower substrate 50 of approximately one pixel area is schematically shown in cross section taken along a section line B—B of FIG. 4A passing through the thin film transistor 84. However, in FIG. 6, the reflection layer 70 is provided over the TFT 84, which is different from the case shown in FIGS. 4A and 4B. Further, in FIG. 6, the passivation film 64, which has been shown in FIG. 3, is omitted for simplifying the drawing. As shown in FIG. 6, the contact hole 92 is formed in the second insulation layer 68 in the vicinity of the source electrode 90. Since the reflection electrode 70 fills the contact hole 92, and thus, is electrically coupled to the source electrode 90 and the upper electrode 62. The remaining portions of FIG. 6 have been referred to in the above, and as such, the descriptions thereof will be omitted for the sake of simplifying the disclosure. It is understood from the foregoing that it is a design choice to provide the reflection layer 70 over the thin film transistor 84.

The location of the contact hole 92 is not limited to the neighborhood of the source electrode 90 as mentioned above. As an alternative, the contact hole 92 may be formed at any position over the upper electrode 62 in that the electrode 62 is electrically coupled to the source electrode 90. Especially, when the second insulation layer 68 is formed using a positive photoresist, sufficient exposure is needed to form the contact hole 92. In such case, it is preferable to form the contact hole 92 above the upper electrode 62 that has high light reflectivity.

A method of fabricating the lower substrate 50 of FIG. 6 will be described with reference to FIGS. 7A–7I. In these figures, the passivation film 64 is not illustrated for the sake of simplifying the drawings.

Figure 7A:
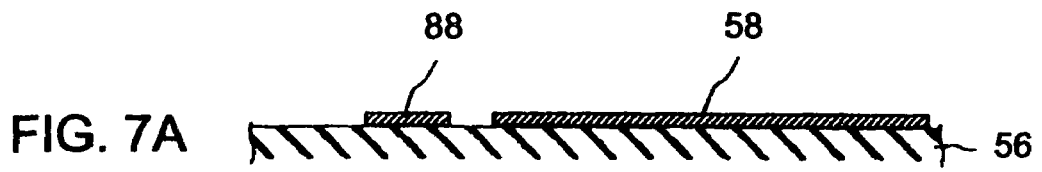
FIGS. 7A to 7I are each showing a processing step of fabricating a lower substrate according to the embodiment of the present invention.

First, as shown in FIG. 7A, chrome (Cr) is deposited to a thickness of about 50 nm all over the surface of the glass substrate 56 by way of a spattering method, after which the chrome layer is patterned so as to form the lower electrode 58, the gate electrode 88, and a gate line (not shown).

Figure 7B:
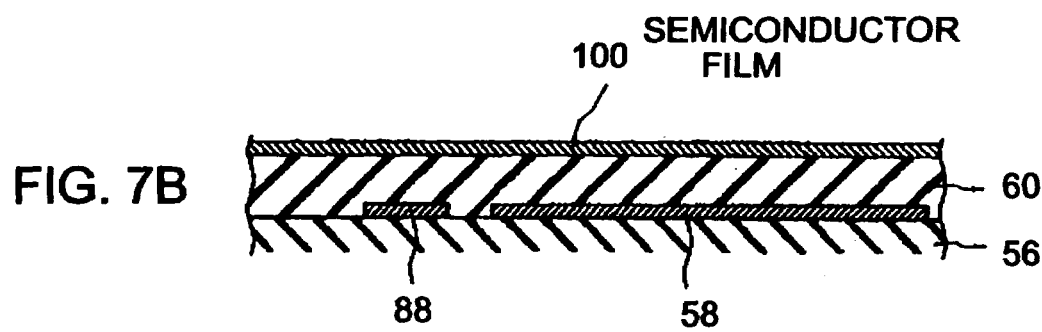
Figure 7C:
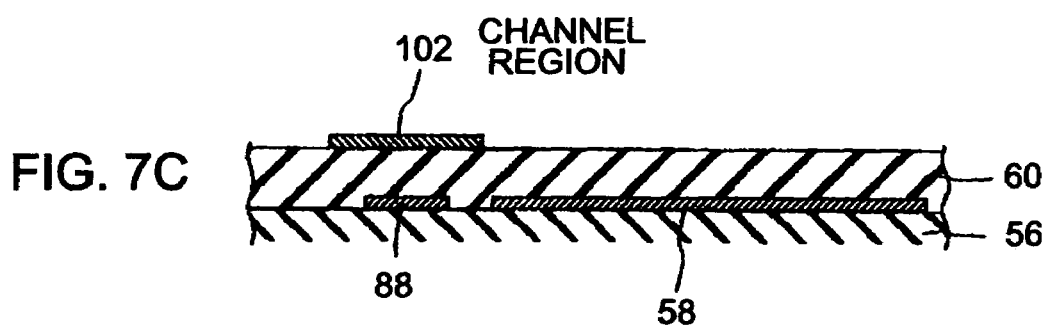
Figure 7D:
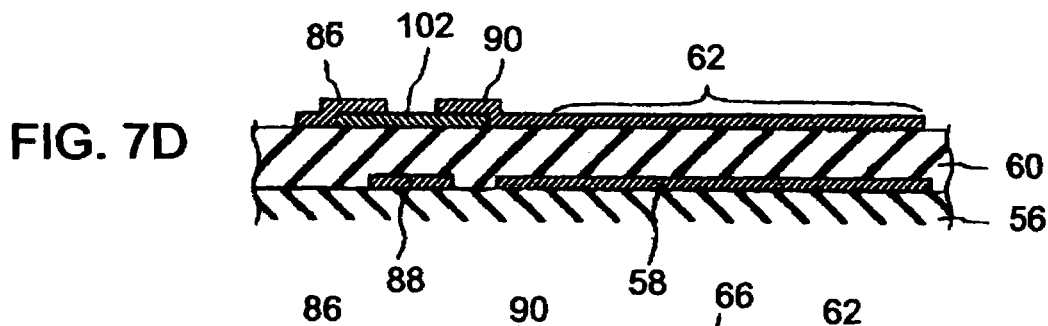

Subsequently, as shown in FIG. 7B, the lower insulation film 60, which also becomes the gate insulation film, is formed up to about 400 nm using plasma-enhanced CDV (chemical vapor deposition) technology. Thereafter, a semiconductor layer 100 is formed up to about 200 nm on the lower insulation layer 60 using plasma-enhanced CDV technology, in which it is allowable that the layer 100 includes a suitable doping layer. Following this, as shown in FIG. 7C, the semiconductor layer 100 is patterned to form a channel area 102. After the channel area 102 is formed, chrome layer and ITO (indium tin oxide) layer are respectively deposited up to 50 nm. Thereafter, as shown in FIG. 7D, the chrome and ITO layers are patterned to form the drain electrode 86, the source electrode 90, the upper electrode 62, and the drain line (not shown).

Figure 7E:
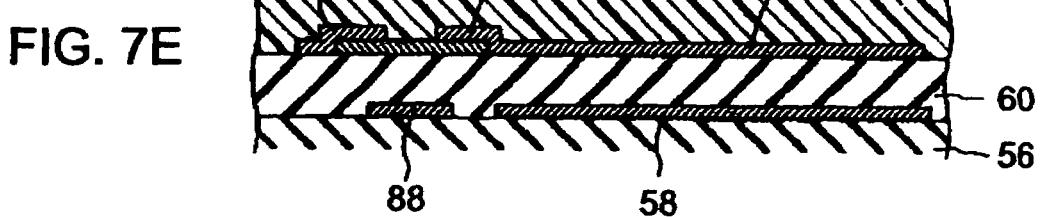
Figure 7F:
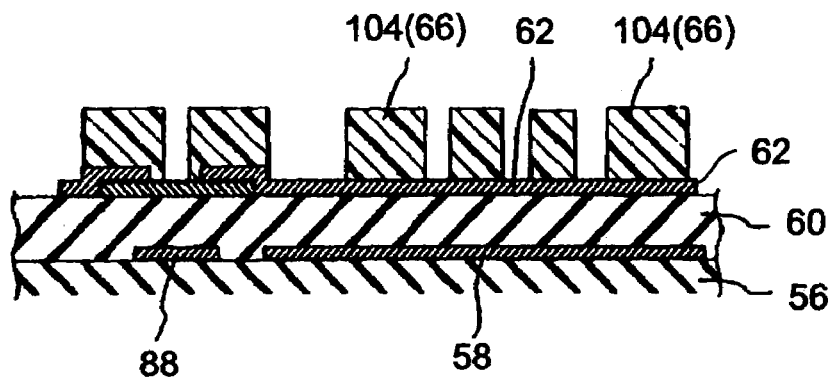

Subsequently, as shown in FIG. 7E, the first insulation layer 66 is formed to about 3 μm on the entire surface of the substrate obtained in FIG. 7D, after which, as shown in FIG. 7F, the layer 66 is patterned by photolithography so as to obtain predetermined projections 104. The first insulation layer 66 may be positive or negative photoresist. It is typical to use a photoresist with relatively low sensitivity. According to the embodiment of the present invention, when the first insulation layer 66 is patterned, the light that has passed through the layer 66 is reflected by the upper electrode 62 and directed back to the layer 66, thereby being able to reduce the amount of the exposing light. By way of example, it is possible to approximately halve the amount of the exposing light compared with the case where the upper electrode 62 is not provided.

Figure 7G:
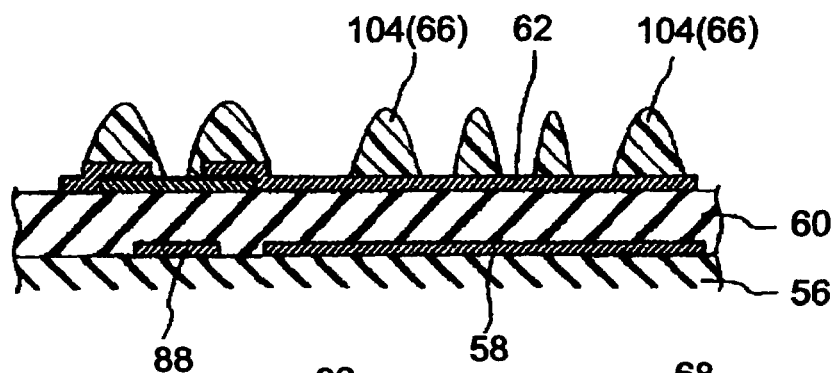

After the first insulation layer 66 has been patterned, the projections 104(66) are heat-treated in a nitrogen atmosphere at a temperature of about 260° C. for a time period of one hour so as to smooth the shapes thereof, as shown in FIG. 7G. Alternatively, the shaping of the projections 104(66) can be carried out using suitable chemicals.

Figure 7H:
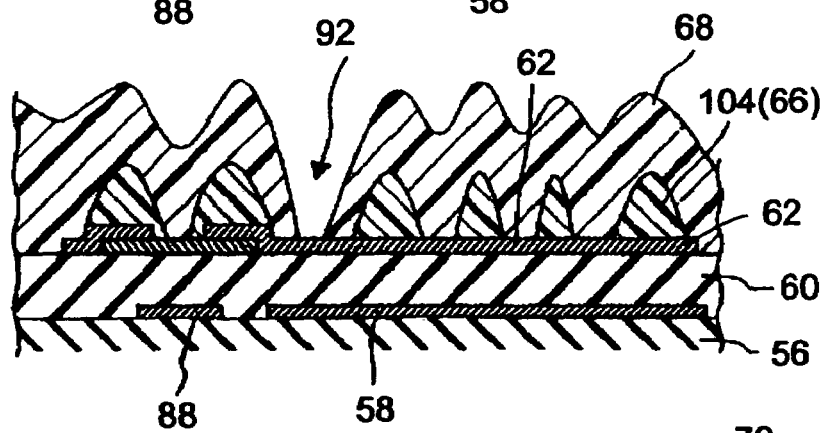

Subsequently, as shown in FIG. 7H, the second insulation layer 68 is formed to approximately 1 μm onto the resultant substrate obtained at the preceding step (FIG. 7G), in the case of which, in order that the second insulation layer 68 has a surface following the irregular surface of the first insulation layer 104(66), it is necessary to appropriately select the material, a thickness and a layer forming method.

Thereafter, the contact hole 92 is formed at the insulation layer 68 that is preferably a photoresist layer so as to facilitate the formation of the contact hole 92.

Figure 7I:
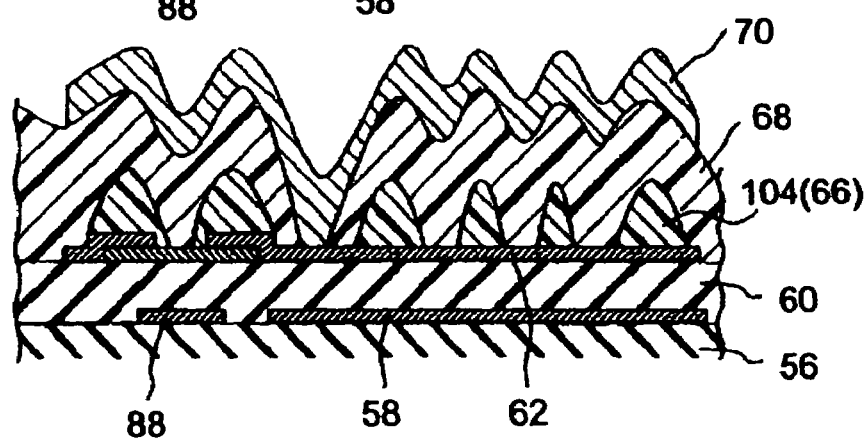

Thereafter, as shown in FIG. 7I, an aluminum film is formed to a thickness of approximately 300 nm onto the substrate obtained in the process of FIG. 7H, and then is patterned to form the reflection electrode 70. In the above process, the aluminum fills in the contact hole 92 so that the reflection electrode 70 is electrically connected to the source electrode 90 and the upper electrode 62. By way of example, the patterning of the aluminum film is subject to wet-etching using a mixed solution of phosphoric, acetic and nitric acids heated up to a temperature of about 60° C. Thus, the lower substrate 50 is obtained.

The maximum difference in level (steps) on the surface of the reflection electrode (or film) 70 may be about 1 μm. However, the maximum difference in level in question is not limited thereto. By way of example, good reflective characteristics are obtained if the difference in level is between 0.4 to 5 μm. As mentioned above, the surface pattern of the reflection film 70 is rendered irregular for achieving enhanced reflectivity.

Finally, the lower substrate 50 and the upper substrate 52 are disposed in such a manner to face each other while carrying therebetween a plurality of spherical spacers. Thereafter, the two substrates 50 and 52 are bonded together using suitable adhesives leaving a liquid crystal injection port, after which a liquid crystal is injected through the port that is then hermetically sealed, and thus, a LCD device is assembled.

In the above-mentioned fabrication process, the gate insulation film (viz., the first insulation film) 60 is made of silicon nitride, and the semiconductor layer 100 is made of amorphous silicon, by way of example. When the silicon nitride film is formed by a plasma-enhanced CVD method, silane and oxygen gases are used as reactant gases, wherein the gas flow rate ratio (silane/oxygen) is about 0.1 to 0.5, a film forming temperature is about 200 to 300° C., pressure is 133 Pa, and the plasma-enhanced power is 200 W, by way of example. On the other hand, when the silicon nitride film is deposited by a plasma-enhanced CVD method, wherein silane and ammonia gases are used, the gas flow rate ratio (silane/ammonia) is about 0.1 to 0.8, a film forming temperature is about 250° C., pressure is 133 Pa, and the plasma-enhanced power is 200 W, by way of example. Still further, when the amorphous silicon film is deposited by a plasma-enhanced CVD method, wherein silane and hydrogen gases are used, the gas flow rate ratio (silane/hydrogen) is about 0.25 to 2.0, a film forming temperature is about 200 to 250° C., pressure is 133 Pa, and the plasma-enhanced power is 50 W, by way of example. Still further, when the n-type amorphous silicon film is deposited by a plasma-enhanced CVD method, wherein silane and phosphate gases are used, the gas amount flow ratio (silane/phosphate) is about 1.0 to 2.0, a film forming temperature is about 200 to 250° C., pressure is 133 Pa, and the plasma power is 50 W, by way of example.

In the above, dry-etching techniques can be used when patterning the silicon nitride film or amorphous silicon film. In the case of etching the silicon nitride film, the etching gases are fluorine tetrachloride gas and oxygen gas, the reactive pressure is 0.665 to 39.9 Pa, and the plasma power is 100 to 300 W. Further, when etching the amorphous silicon film, chlorine and hydrogen gases are used, the reactive pressure is 0.665 to 39.9 Pa, and the plasma power is 50 to 200 W. Still further, in order to etch the chrome layer for the gate electrode, and so on, it is possible to use a mixed solution of perchloric acid and second ammonium cerium nitrate.

In the above, although the source and drain electrodes are formed using Cr, and the gate electrode is formed using metal Cr, the present invention is not limited to such materials. That is, each of these electrodes may be a single film made up of one selected from Ti, W, Mo, Ta, Cu, Al, Ag, ITO, ZnO, SnO, etc. or a multi-layer of two or more among these materials.

In the following, there will be described four modifications of the above-mentioned preferred embodiment of the present invention with reference to FIGS. 8A–8C and FIG. 9. Since the upper substrate 52 remains unchanged in these modifications, only the lower substrate 50 will be discussed.

Figure 8A:
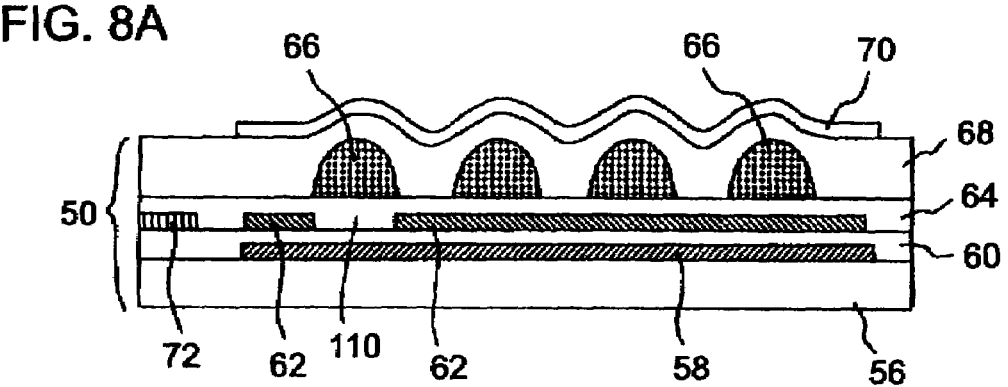
FIGS. 8A to 8C are each showing a modification of the embodiment shown in FIGS. 3 to 7I.

Referring to FIG. 8A, a first modification of the preferred embodiment of the present invention is schematically shown. The first modification of FIG. 8A is such that the upper electrode 62 is not provided entirely under the irregularly shaped surface of the first insulation layer 66. That is to say, the upper electrode 62 is not provided at a portion (denoted by reference numeral 110). Other than this, the structure of the lower substrate 50 is identical to that shown in FIG. 3. Since the lower electrode 58 is provided under the portion 110, when the first insulation layer 66 is exposed, the light passing through the portion 110 is effectively reflected by the lower electrode 58, thereby to be able to reduce the amount of exposing light and/or the exposing time as in the above-mentioned embodiment.

Figure 8B:
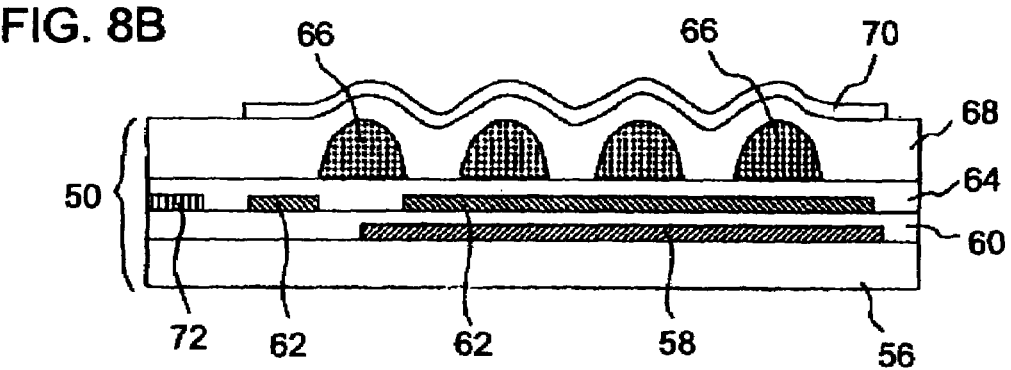
Figure 8C:
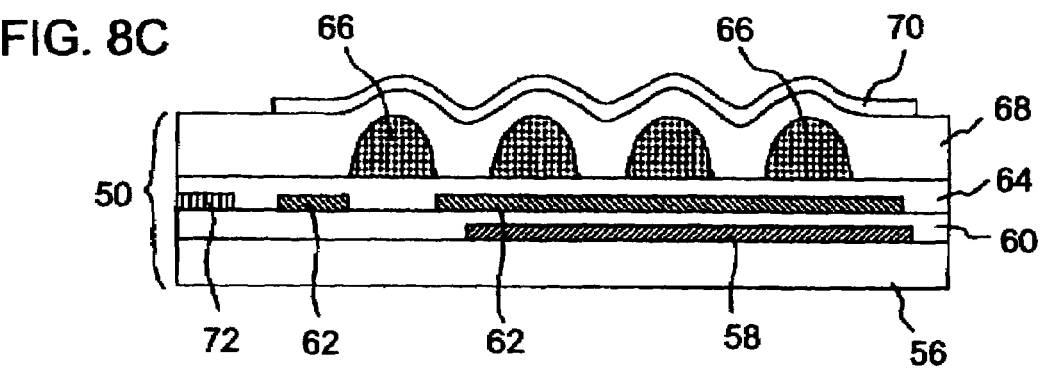

Referring to FIGS. 8B and 8C, second and third modifications of the preferred embodiment of the present invention is schematically shown. Each of the second and third modifications is such that each of the upper and lower electrodes 62 and 58 is not provided entirely under the irregularly shaped surface of the first insulation layer 66. However, in order to achieve effective reduction of the amount of exposing light and/or the exposing time as in the above-mentioned embodiment, it is preferable to provide the upper and lower electrodes 62 and 58 so as to be present under more than a half of the irregularly shaped surface of the first insulation layer 66.

Figure 9:
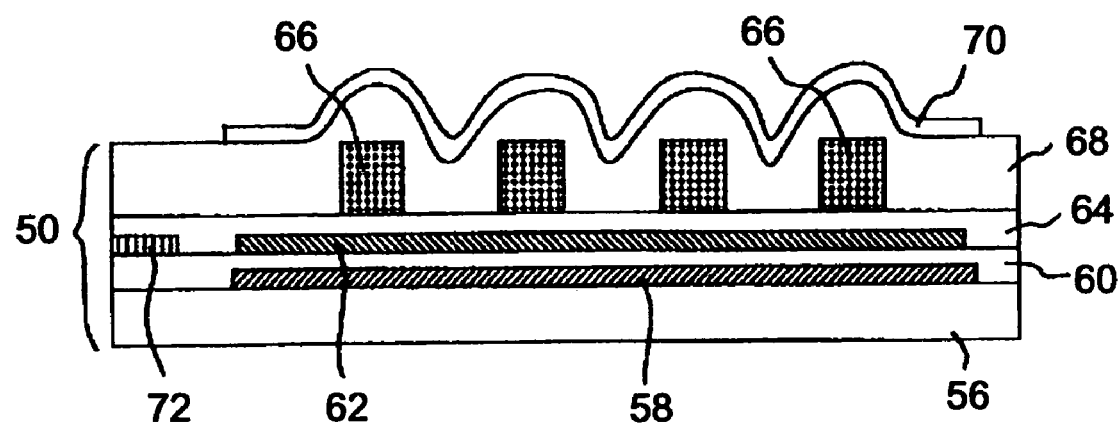
FIG. 9 is a diagram schematically showing another modification of the embodiment shown in FIGS. 3 to 7I.

FIG. 9 shows a fourth modification of the preferred embodiment of the present invention. The fourth modification is such that the processing step of smoothing the projections of the first insulating layer 66 (FIG. 7G) is omitted. In this case, the irregularly shaped surface of the reflection layer 70 exhibits sharp angles as schematically illustrated in FIG. 9. It goes without saying that each of the first to third modifications can be applied to the fourth modification.

In the above, the first and second insulation layers 66 and 68 can be replaced by a single insulation layer (photoresist layer). In this case, it is necessary to form, on the single insulation layer in question, a deep hole for use as the contact hole 92 and also a plurality of shallow recesses for forming the irregular surface (viz., convex-concave structure) on the reflection layer 70, and thus, it is preferable to form such deep hole and shallow recesses using a so-called halftone exposing method.

Referring to FIGS. 10A to 10F, there will be described a method of forming the deep hole (denoted by 118) and the shallow recesses (denoted by 119) in the single insulation layer instead of the two layers 66 and 68 (FIG. 3 for example). In this case, it is assumed that the processes already described with reference to FIGS. 7A to 7D are also used, and thus, the description starts on the assumption that the patterning of the upper electrode 62 (FIG. 7D) has been completed. The resultant substrate obtained after completing the patterning shown in FIG. 7D is denoted by 120 in FIGS. 10A to 10F.

Figure 1:
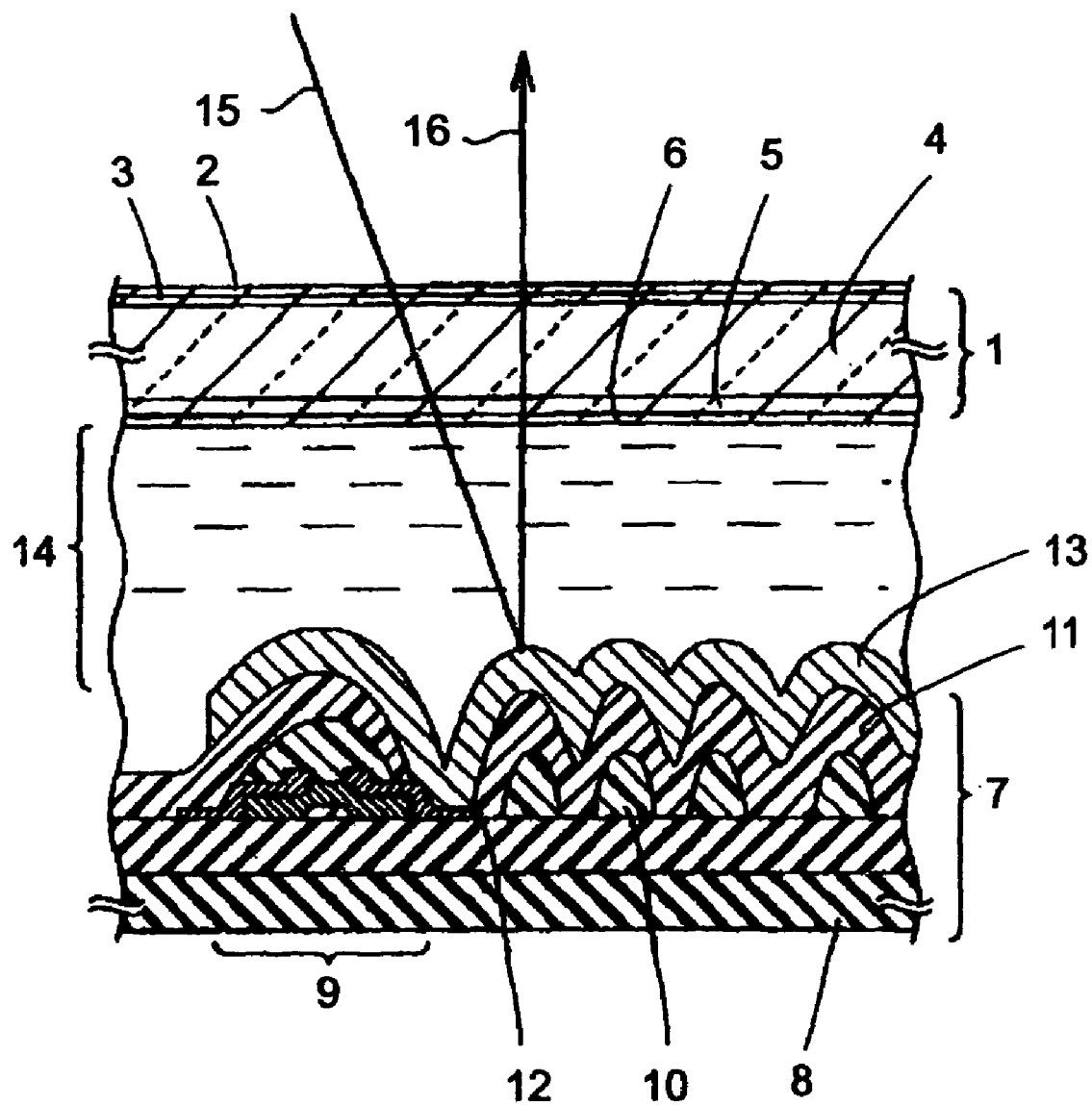
FIG. 1 is a schematic cross section of approximately one pixel area according to conventional technology, having been referred to in the opening paragraphs.
Figure 2A:
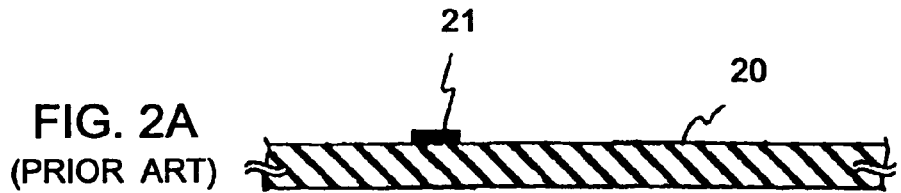
FIGS. 2A to 2J are each showing a processing step of fabricating a lower substrate of FIG. 1.
Figure 2B:
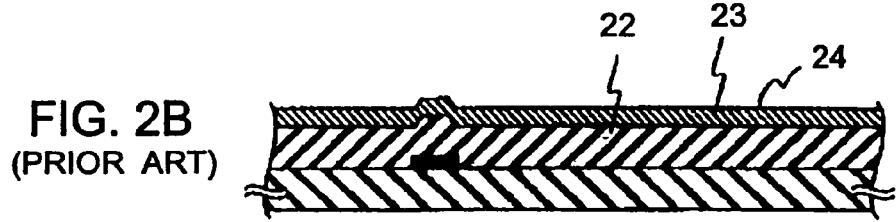
Figure 2C:
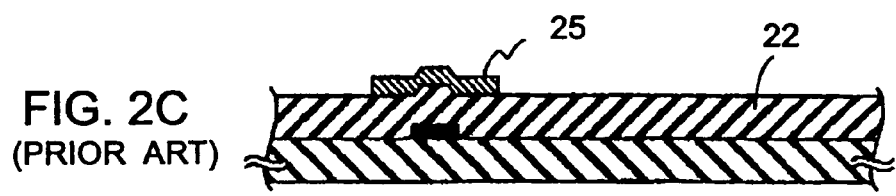
Figure 2D:
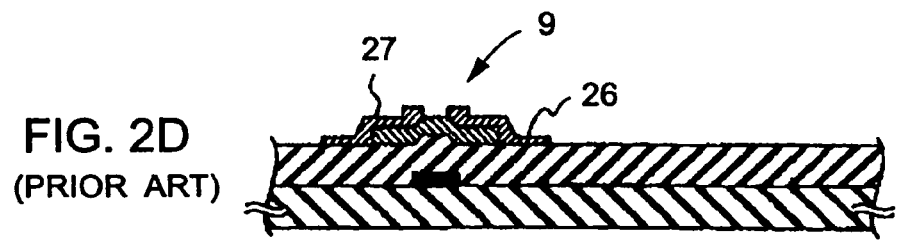
Figure 2E:
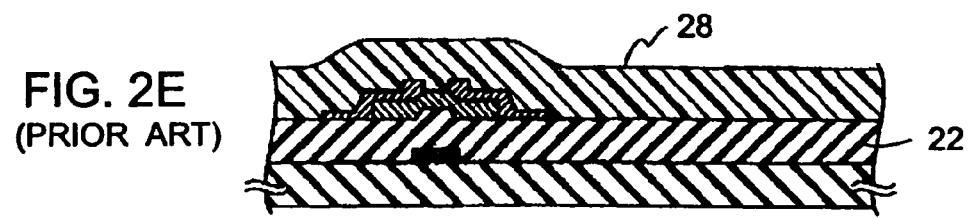
Figure 2F:
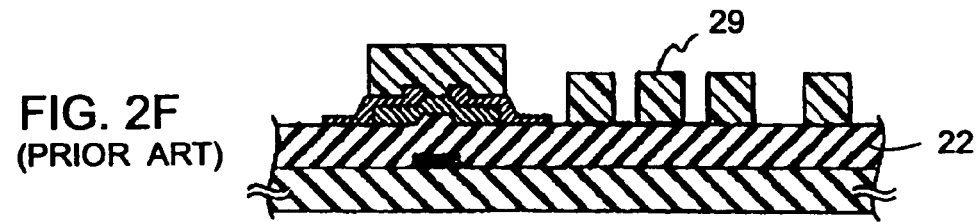
Figure 2G:
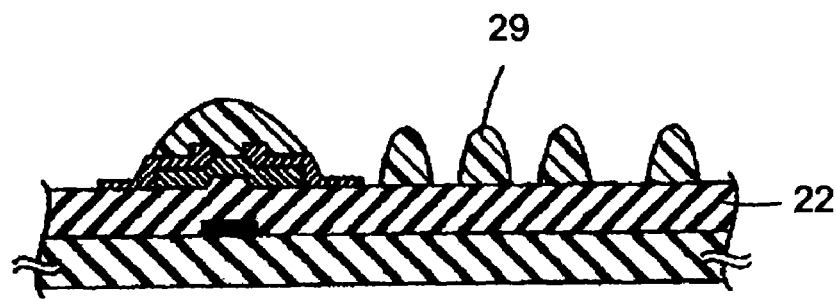
Figure 2H:
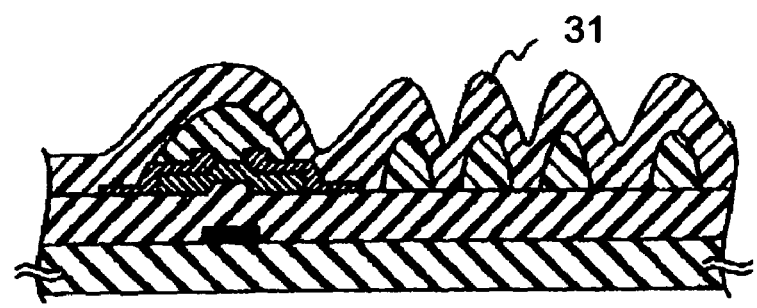
Figure 2I:
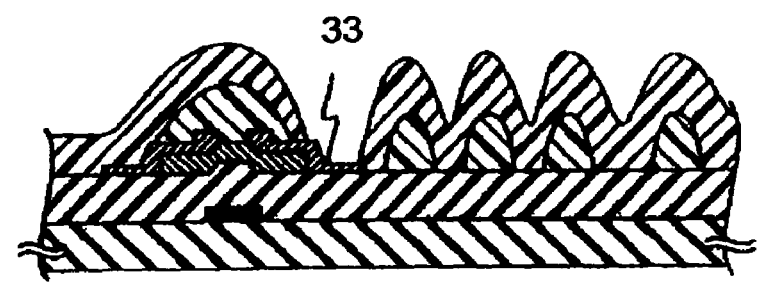
Figure 2J:
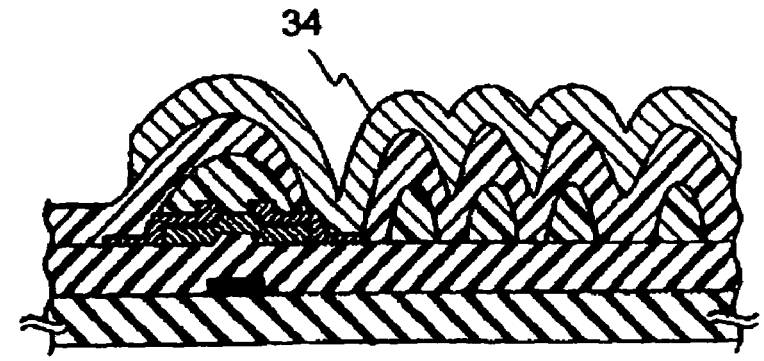
Figure 10A:
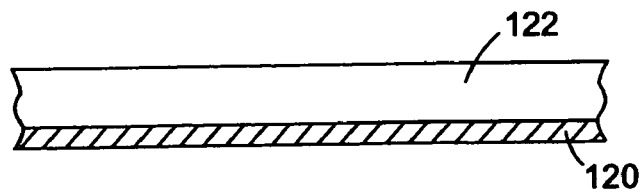
FIGS. 10A to 10F are each schematically showing a processing step of fabricating a modified lower substrate according to the present invention.
Figure 10B:
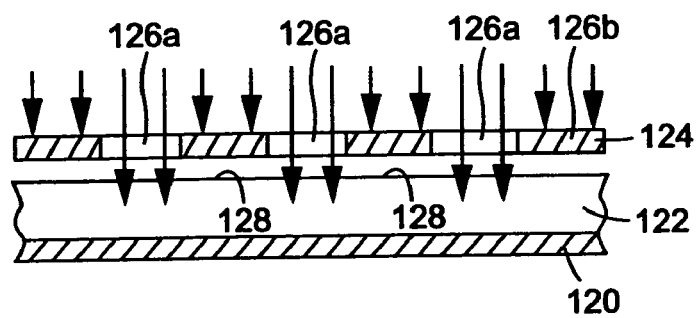

As shown in FIG. 1A, an insulation layer 122, which is typically a positive type photoresist, is formed to a thickness of about 1 to 5 μm all over the aforesaid substrate 120. Subsequently, as shown in FIG. 10B, a first photo-mask 124 provided with light transmitting areas 126a and light shielding areas 126b is aligned such that the light shielding areas 126b are positioned on the portions 128 corresponding to the projections to be formed. Thereafter, the insulation layer 122 is subject to exposure with a low, uniform intensity of illumination. The arrows indicate light rays illuminating the mask 124 and the substrate 122.

Figure 10C:
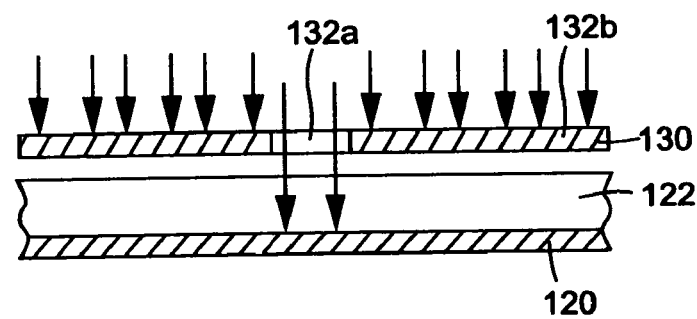

Subsequently, as shown in FIG. 10C, a second photo-mask 130 having a light transmitting area 132a and a light shielding area 132b is aligned such that the light transmitting area 132a is positioned on the portion whereat the deep hole 118 is to be formed. Thereafter, the insulation layer 122 is exposed with a high, uniform intensity of illumination. In this case, the portion at which the deep hole 118 is to be formed should be selected so as to be above the upper electrode 62. Following this, the substrate 122 is developed thereby to completely remove the strongly exposed portion and to partially remove the weakly exposed portions. In this case, it is preferable to control the amount of light rays applied to the portions where the recesses are to be formed such that about 40% of the whole thickness of the substrate 122 remains.

Figure 10D:
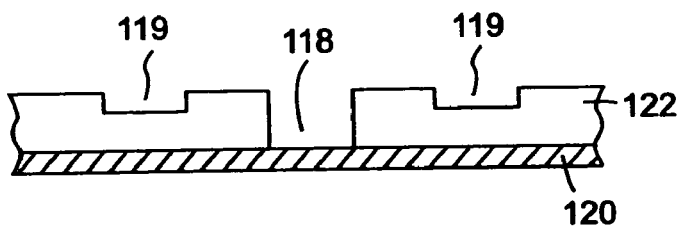
Figure 10E:
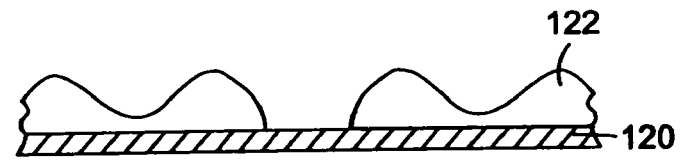
Figure 10F:
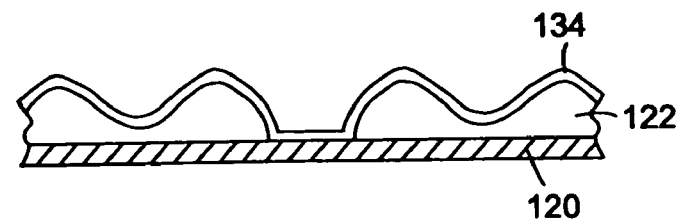

Subsequently, as shown in FIG. 10E, the substrate obtained at the preceding process (FIG. 10D) is heat-treated at a temperature of approximately 200° C. for a time period of about 60 minutes, whereby the layer 22 of FIG. 10D is thermally deformed so as to exhibit smoothed outer shapes as shown in FIG. 10E. Thereafter, an aluminum film is deposited to a thickness of approximately 200 nm on the resultant substrate obtained at the preceding process (FIG. 10E) by spattering and patterning, thereby to form a reflection electrode 134 that corresponds to the reflection electrode 70.

The method of fabricating the reflection electrode (or film) 70, which has been described above, features that the number of fabrication processes can be reduced, resulting in the fact that the cost of manufacturing the lower substrate 50 can be reduced. The method in question is applicable to the case shown in FIGS. 9A to 9C.

Figure 11A:
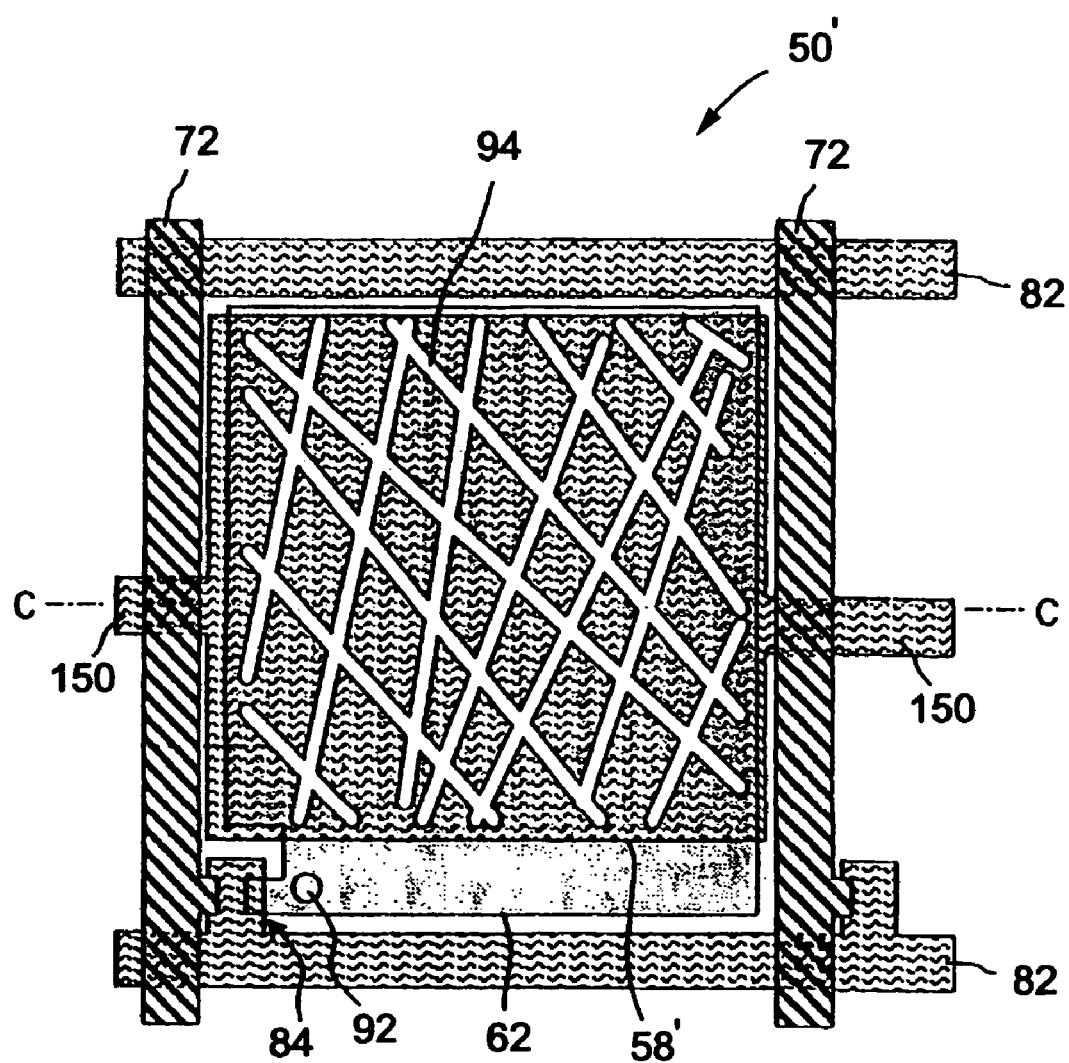
FIGS. 11A and 11B are each showing another modification of the preferred embodiment described with reference to FIGS. 3 to 7I.
Figure 11B:
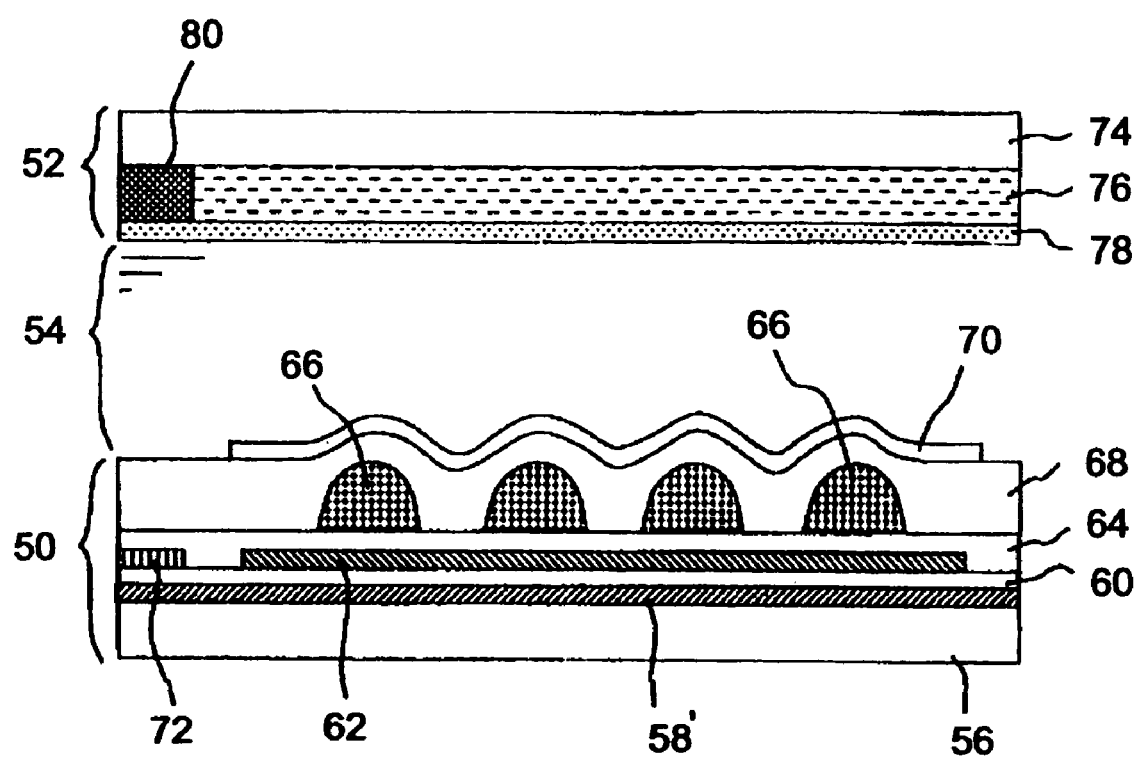

Referring to FIG. 11A, there is schematically shown a fifth modification of the above-mentioned embodiment of the present invention wherein the portions already referred to above are denoted by like reference numerals. FIG. 11A is a schematic plan view of a lower substrate 50' of approximately one pixel area. In FIG. 11A, the reflection layer 66 is not shown for the sake of simplifying the drawing as in FIG. 4B. The lower substrate 50' corresponds to the lower substrate 50 of FIGS. 4, 5A and 5B. According to the fifth modification, a lower electrode 58' is coupled to or integrally formed with a common electrode 150 extending in parallel with the gate lines 82. In other words, the lower electrode 58' is not coupled to (or integral with) the gate line 82 contrary to the arrangements shown in FIGS. 5A and 5B. The common electrode 150 is coupled to a predetermined potential source (e.g., grounded). Other than this, the fifth modification is substantially identical to the embodiment already described with referent to FIGS. 4, 5A, 5B, etc., and accordingly, further details will be omitted for simplifying the instant disclosure. FIG. 11B is a schematic section view taken along the section line C—C of FIG. 11A.

Figure 12A:
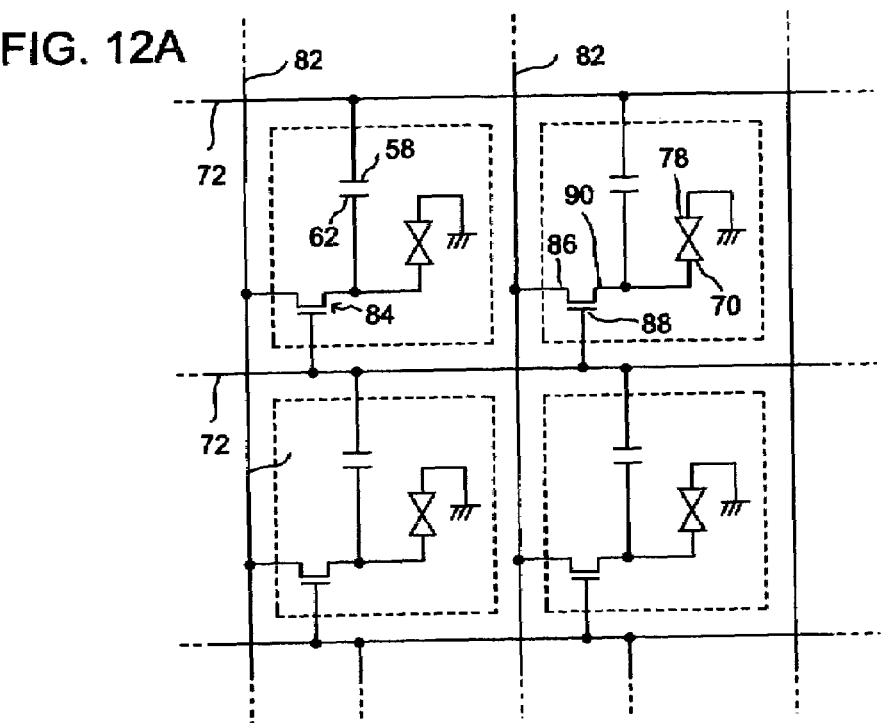
FIGS. 12A and 12B are each showing an equivalent circuit of the LCD according to the present invention.
Figure 12B:
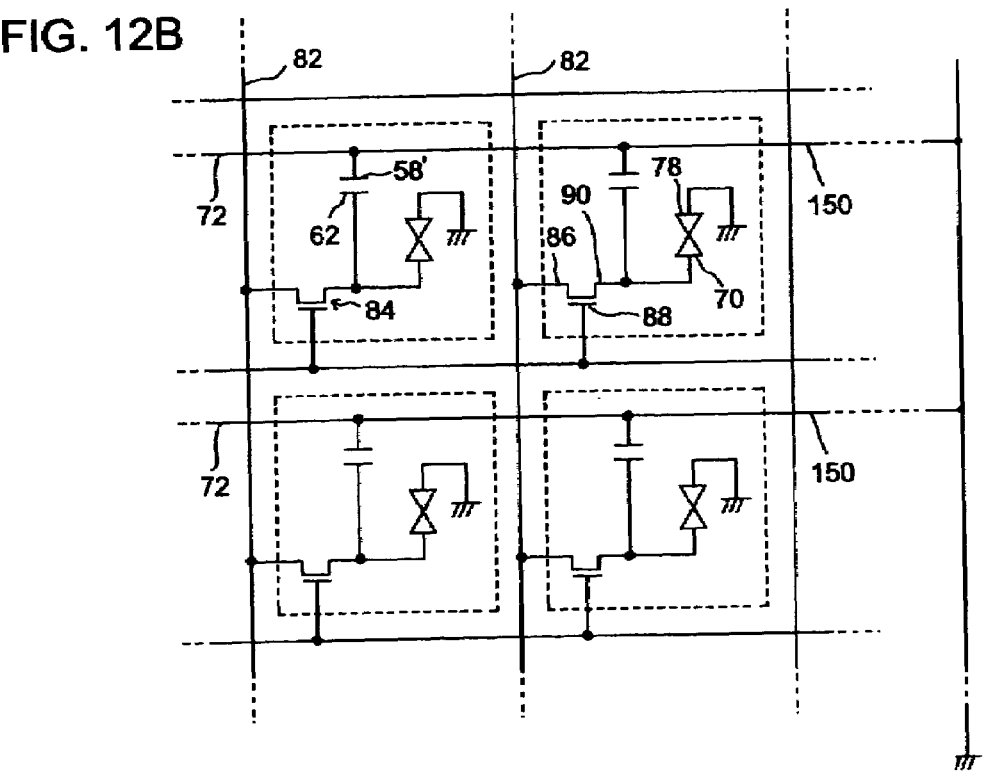

FIG. 12A is an equivalent circuit of part of the liquid crystal display having the lower substrates 50 shown in FIGS. 3 to 8C, while FIG. 12B is an equivalent circuit of part of the liquid crystal display having the lower substrates 50' shown in FIGS. 11A and 11B.

The foregoing descriptions show one preferred embodiment and several modifications thereof. However, other various modifications are apparent to those skilled in the art without departing from the scope of the present invention which is only limited by the appended claims. Therefore, the embodiments and modification shown and described are only illustrated, not restrictive.

What is claimed is:

1. A method of fabricating an active-matrix addressed liquid crystal display, comprising:
    providing a first substrate;
    forming a lower electrode on said first substrate;
    forming a lower insulation film on said lower electrode;
    forming an upper electrode on said lower insulation film;
    forming an insulation layer having an irregularly configured surface over said upper electrode;
    forming a reflection film on said irregularly configured surface of said insulation layer;
    providing a liquid crystal layer over said reflection film; and
    providing a second substrate over said liquid crystal layer,
    wherein the irregularly configured surface of said insulation layer comprises a plurality of substantially linear projections, and
    wherein at least one of said upper electrode and said lower electrode extends across more than half of a pixel area.

2. The method of claim 1, wherein said irregularly configured surface further comprises a plurality of recesses surrounded by said plurality of substantially linear projections.

3. The method of claim 1, further comprising:
    providing a plurality of switching elements for each pixel of said display.

4. The method of claim 3, further comprising:
    electrically coupling said upper electrode to a source electrode of at least one of said plurality of switching elements.

5. The method of claim 1, wherein providing said upper electrode comprises:
    providing an upper electrode for each pixel of said display and in a region where said reflection film is provided.

6. The method of claim 1, wherein said upper electrode, said lower insulation film, and said upper electrode form a storage capacitor.

7. The method of claim 1, wherein said lower electrode extends across more than half of the pixel area.

8. The method of claim 1, wherein said upper electrode extends across more than half of the pixel area.

9. The method of claim 1, wherein said at least one of said upper electrode and lower electrode covers a center line of the pixel area.

10. The method of claim 1, wherein both of said upper electrode and said lower electrode extend across more than half of the pixel area.

11. The method of claim 10, wherein said upper electrode comprises a reflective upper electrode.

12. The method of claim 11, wherein said upper electrode comprises at least one of Chrome and Molybdenum.

13. The method of claim 10, wherein said lower electrode comprises a reflective lower electrode.

14. The method of claim 13, wherein said lower electrode comprises at least one of Chrome and Molybdenum.

* * * * *